United States Patent [19]

Shimamune et al.

[11] Patent Number: 5,384,882
[45] Date of Patent: Jan. 24, 1995

[54] IMAGE DISPLAY DEVICE AND ITS MANUFACTURING METHOD

[75] Inventors: Minoru Shimamune, Omihachiman; Takuo Ito; Takao Negishi, both of Otsu; Kouzou Takano, Gamou, all of Japan

[73] Assignee: Toray Industries, Inc., Tokyo, Japan

[21] Appl. No.: 190,578

[22] Filed: Feb. 2, 1994

Related U.S. Application Data

[63] Continuation of Ser. No. 856,957, Aug. 10, 1992, abandoned.

[51] Int. Cl.⁶ ............................................. G02B 6/06
[52] U.S. Cl. ................................ 385/116; 385/119; 385/901; 385/33
[58] Field of Search ............... 385/115, 116, 117, 119, 385/120, 901, 900, 31, 33; 156/249

[56] References Cited

U.S. PATENT DOCUMENTS

| | | | |
|---|---|---|---|
| 3,853,658 | 12/1974 | Ney | 385/116 |
| 4,814,948 | 3/1989 | Hasegawa | 362/32 |
| 4,925,514 | 5/1990 | Okada et al. | 385/140 |
| 4,983,015 | 1/1991 | Bourguignat et al. | 385/116 |
| 4,986,628 | 1/1991 | Lozhenko et al. | 385/31 |
| 5,073,402 | 12/1991 | Henderson | 427/2 |
| 5,127,080 | 6/1992 | Duggan, Sr. | 385/120 |
| 5,150,445 | 9/1992 | Toyoda et al. | 385/116 |
| 5,193,526 | 3/1993 | Daikuzono | 128/7 |

FOREIGN PATENT DOCUMENTS

| | | | |
|---|---|---|---|
| 0275061 | 7/1988 | European Pat. Off. | G02B 6/06 |
| 0357070 | 3/1990 | European Pat. Off. | G02B 6/08 |
| 50-104646 | 8/1975 | Japan | G02B 6/08 |
| 61-11782 | 1/1986 | Japan | G09F 9/00 |
| 63-60111 | 4/1988 | Japan | G02B 6/06 |
| 2-294684 | 12/1990 | Japan | G02B 6/04 |
| 4-138403 | 5/1992 | Japan | G02B 6/00 |

*Primary Examiner*—Frank Gonzalez
*Attorney, Agent, or Firm*—Fish & Richardson

[57] ABSTRACT

In the image display device of the present invention, a number of light scattering layers formed on the ends of optical fibers are spotwise distributed on the image display surface, and said scattering layers are comprised of a transparent resin having a granular light scattering material added or very small depressions and projections produced on the surface. Further, the method of manufacturing the image display device according to the present invention is characterized by arranging the end faces of a number of optical fibers to the image display surface, then applying a photosensitive resin onto the image display surface, hardening the resin around the end of the respective optical fibers on the image display surface by the beam of light from the incident surface to form light scattering layers, then removing the unhardened portions. With the image display device thus obtained, an image is transmitted via a number of optical fibers and displayed via a number of light scattering layers, and so a wide angle is provided for the field of vision, and also with the dark colored ground, it is possible to reduce the reflection of the light of disturbance at portions other than the light scattering layers and thus display a clear image of high contrast.

16 Claims, 2 Drawing Sheets

IMAGE DISPLAY DEVICE AND ITS MANUFACTURING METHOD

This application is a continuation of U.S. application Ser. No. 07/856,957, filed Aug. 10, 1992, now abandoned.

TECHNICAL FIELD

This invention relates to a device for transmitting and displaying imagery using optical fibers. More specifically, it relates to a device being adapted for increasing the size of the image, having a broad angle of field and being scarcely affected by the environmental disturbing light and being capable of displaying a distinct image of a high resolution.

BACKGROUND OF THE INVENTION

As a device for transmitting and displaying an image with optical fibers, two types are generally known. One is the so-called image guide or imagescope which displays a full-size image with optical fibers densely bundled in the same arrangement for both incident and image display planes, and the other is an image display device having a function enlargement with a greater clearance of optical fibers provided for the image display plane than for the incident plane to form a large screen of an image size of several feet. In either case, the image display surface (screen surface) is formed by cut end faces of the optical fibers. However, the beams of light coming from the end faces are highly directional, and so the image may be clearly seen in a certain range of angle to the image display surface, that is, in a nearly vertical direction. However, it becomes very difficult to observe the image as that angle to the perpendicular of the image display surface increases. That is, such a device has a shortcoming that the angle of the field of vision is limited. Then, in the case of a large size screen which is particularly intended for a number of persons to see at the same time, some means are required to scatter the outcoming light over a wide range of angles.

The conventional countermeasures to this problem are classified largely into two methods: one is to scatter the light emitted from the optical fibers with a light scattering plate or film pasted on the image display surface (which will be referred to as "screen surface" in the following where a large screen is concerned); and the other to provide a light scattering structure at the end face of optical fiber. According to the former method, the light scattering plate or film reflects the environmental disturbing light, and hence has the disadvantage that the reflected light comingles with the image information displayed thus obscuring the image or, more specifically, reducing the resolution and contrast of the image. As for the latter method of providing a light scattering structure at the portion from which light is emitted, it is practically impossible to work up the end face of each of an optical fiber bundles, especially for a large screen having a hundred thousand of optical fibers present on the screen surface.

There has also been proposed a method of laminating the optical fibers in parallel in a tilted condition at a certain angle to the screen surface, that is, forming the screen surface with the end faces of the optical fibers cut at less than a perpendicular angle to the axis of the optical fiber (Patent Publication No. SHO 61-11782). According to this method, however, the rate of enlargement to the plane of incidence and the scattering on the screen surface or the field angle are simultaneously determined by the extent of tilting in the axial direction of the optical fiber bundles. Thus, it is impossible to independently and separately adjust both elements.

In view of the foregoing shortcomings in the prior art, it is the object of the present invention to provide, by a very simple method, a display device which has a wide angle of the field of vision and which is capable of producing a highly resolved, clear image where the image information is easily recognized.

DISCLOSURE OF THE INVENTION

To resolve the foregoing problems, the present invention is composed of the following.

In an image display device having one end faces and the other end faces of an optical fiber bundle arranged respectively on the image display surface and image incident surface, the image display device of the present invention is characterized in that the image display surface has a number of light scattering layers distributed spotwise, said scattering layer being formed at the end of each of the optical fibers and comprised of a transparent resin having a granular light scattering added or having very small depressions and projections on the surface.

The method of manufacturing the image display device of the invention is characterized by disposing one end faces of an optical fiber bundle onto the image display surface, then applying a photosensitive resin having a granular light scattering agent added over the whole image display surface, having the resin around the end of the respective optical fibers on the image display surface hardened by light from the plane of incidence, and removing any unhardened resin.

DRAWINGS

FIG. 1 schematically shows an example of the image display device of the invention.

Figure 1:
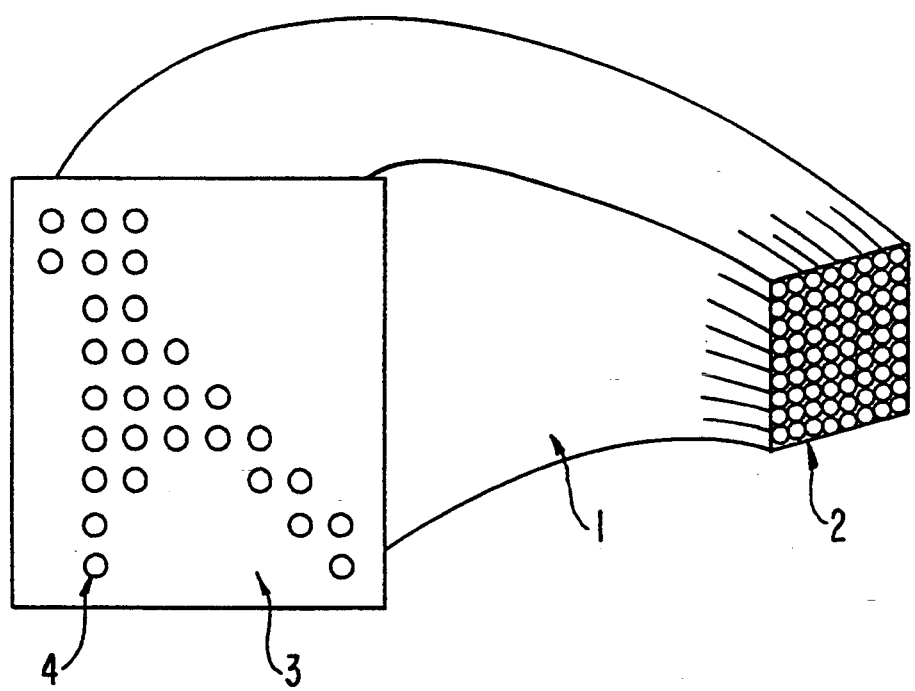

In the drawings, the numerals represent the following.
 1: Optical fiber bundle
 2: Image incident surface
 3: Image display surface (screen surface)
 4: Light scattering layer (microlens)
 5: Hardened photosensitive resin
 6: Scattering agent
 7: Cut end face of optical fiber
 8: Optical fiber
 9 and 10: Source of light
 11: Applied photosensitive resin
 12: Support frame

BEST MODE FOR CARRYING OUT THE INVENTION

The present invention will be described with a large screen having an enlarging function taken as an example.

FIG. 1 is an example of the image display device according to the present invention. In the drawing, numeral 1 shows a bundle of optical fibers transmitting imagery information. Numeral 2 is an image incident surface having optical fibers densely arranged, and numeral 3 is an image display surface or screen surface having the optical fibers similarly arranged to those of the incident surface but at a lower density. Numeral 4 is a hardened region of resin or light scattering layer (also called the microlens) formed on the end face of each of the optical fibers according to the method described later. Incidence of imagery is accomplished by a method of keeping a transmissive liquid crystal image in contact with the image incident surface and applying a light ray from the back, or directly projecting an image onto the incident surface with a cine- or video-projector used.

Figure 2:
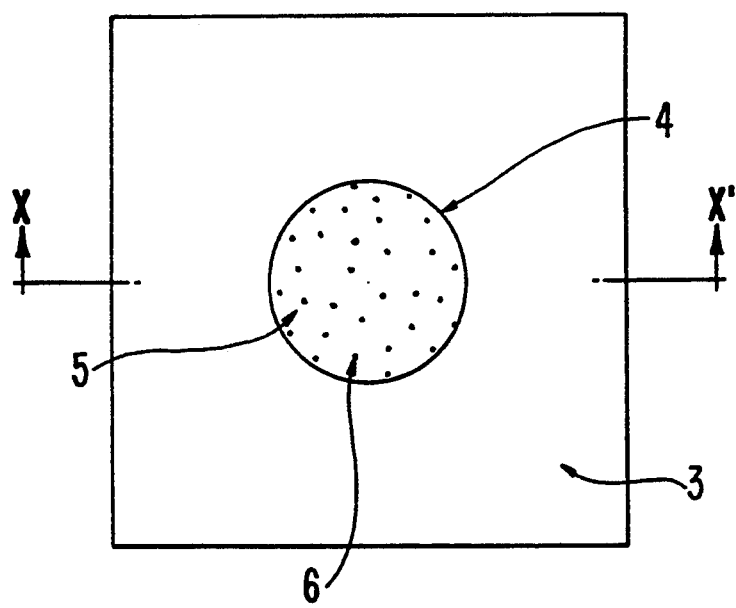
FIG. 2 is an expanded view of the end face of an optical fiber on the screen.
Figure 3:
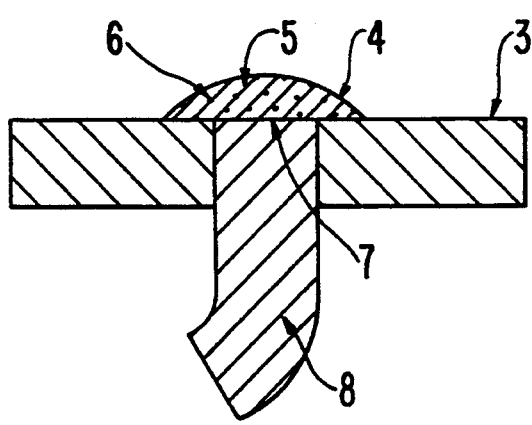
FIG. 3 is a cross-sectional view of the same.

FIG. 2 is an enlarged view of the end face of an optical fiber on the screen, and FIG. 3 is a cross-sectional view of the same. Normally, the optical fiber 8 is sharply cut flush with the component 3 forming the screen and has a microlens 4 formed on the end face 7. Numeral 5 is a transparent resin constituting the lens, and numeral 6 is a light scattering agent added to the transparent resin. Such microlens may be formed on the end face of each optical fiber, but it may also be formed at a rate of one for the end face of a bundle of 3–4 optical fibers (the number being optional). By so doing, it is possible to separately transmit images of three primary colors and synthesize them on the screen to give a color display or transmit a rather weak primary color such as blue via two optical fibers to adjust the color balance as a whole.

Figure 4:
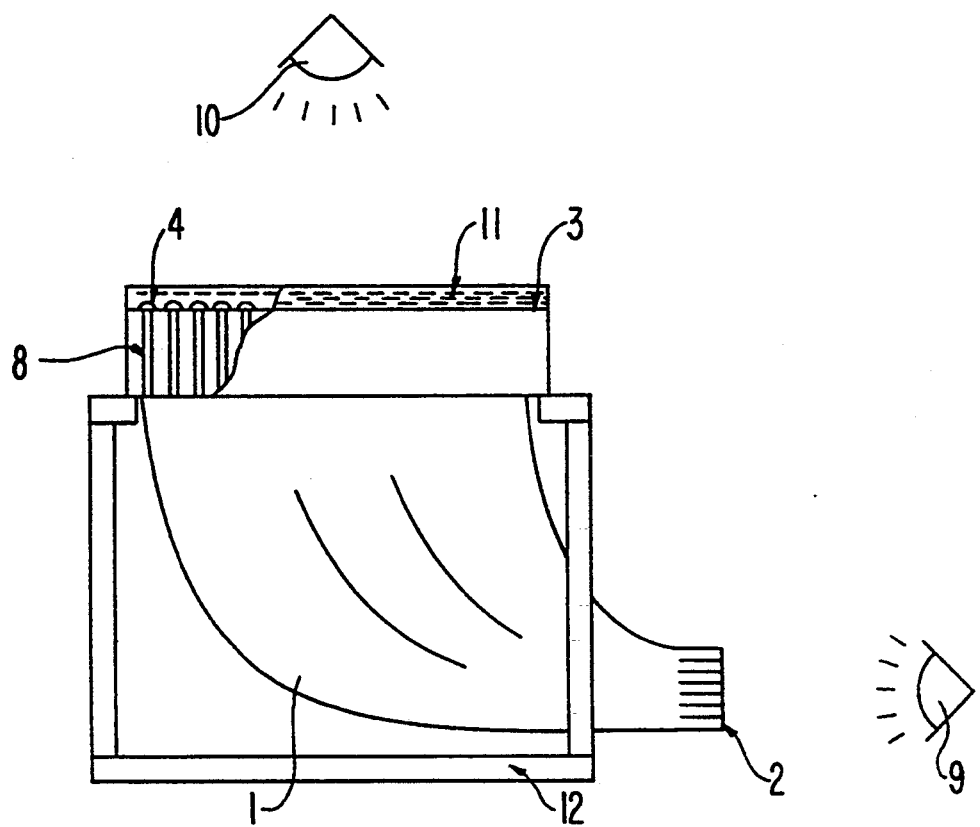
FIG. 4 shows a specific method of forming a scattering microlens in the present invention.

FIG. 4 shows a specific method of forming the light scattering microlens under the present invention.

A photosensitive resin 11 having a light scattering agent added is applied onto the screen surface 3 in a thickness of several microns to several hundred microns with a bar coater or any other appropriate tool used. By radiating a beam of light of a wavelength suitable for hardening the photosensitive resin from the image incident surface 2 with a light source 9 used, the light is transmitted through the optical fibres to the image display surface and scattered by the light scattering agent, and so a region of hardened resin 4 corresponding to the light intensity is formed around the end face of each of the optical fibers. By removing the unhardened resin after radiation for a predetermined time, the hardened resin only remains on the screen surface in a form similar to that having a microlens fitted to each end face of the optical fibers.

The preferable photosensitive resin is a transparent resin that does not preclude transmission of the visible ray a polymer having groups effecting a bridging reaction with light, a polymer serving as a photosensitive material with a photobridging agent admixed, or a monomer which is polymerized by light also may be used. But, from the point of view of hardening stability and adhesivity to the optical fibers, an acrylic, polyamide or polyester photosensitive resin is suitably used. In defining the photosensitivity, resins hardening with the visible to electron and X rays are included, but from ease of acquisition as well as handling, ultraviolet ray hardening type resins are preferable. The source of light for radiation is chosen according to the characteristic of the resin used, and in the case of an ordinary ultraviolet ray hardening resin, for example, a light source generating an ultraviolet ray of a wavelength of 300–400 nm is preferable, and for such purpose, a metal halide lamp, high pressure mercury lamp or mercury xenon lamp is suitable.

Figure 5:
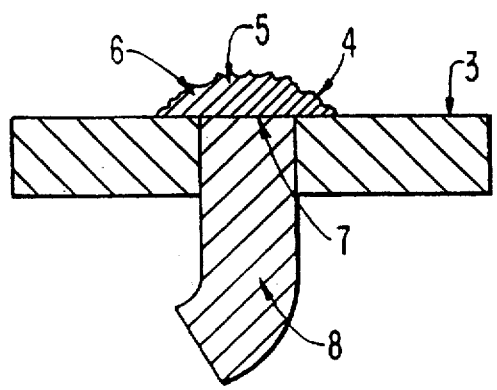
FIG. 5 is a cross-sectional view of the end face of an optical fiber according to another embodiment of the invention.

The light scattering agent to be added is preferably a transparent granular material of a large size. Suitable materials include granular inorganic matters such as glass, quartz, $SiO_2$, LiF and NaF, grains comprised of transparent organic matters such as methacrylic resin and ethylene tetrafluoride resin, and gases such as air, $N_2$ and Ar contained in the fine pores formed in the photosensitive resin. In general, inorganic materials such as glass, $SiO_2$ and $Al_2O_3$ are preferable. As a specific method of use, it is effective to add a granular material having a diameter between several microns to approximately 100 microns in an amount of about 0.5–1.0%. For enhancement of the light scattering effect, it is preferable to design so that the transparent granular material, which is the light scattering agent, is different in the refractive index of the photosensitive resin. For the light scattering agent, a material such as fine particles of aluminum may be used which reflect light without absorbing. Further, the light scattering agent may not be used, but a similar effect is obtainable by imparting very small depressions and projections to the surface of the light scattering layer. These very small depressions and projections may be imparted by pressing the image display surface with heat and having the unhardened resin removed with a roller having very small surface depressions and projections as shown in FIG. 5.

The microlens takes a form of convex lens as the hardened region is produced according to the intensity of light in the respective directions if the resin is applied in a sufficient thickness. But, if the resin is applied in a very thin layer, the microlens takes a disc-like form having only the bottom of the convex lens left. These respectively have a scattering effect depending on the form of the lens, and what form of microlens is employed is determined from the intended angle for the field of vision.

The resin coating thickness must be greater than the thickness of the required microlens. But, excessive application only increase the amount of the unhardened resin and is not effective. The diameter of the optical fiber employed for the present use is generally in the range of 100–1000 microns, and when the necessary form of microlens is taken into consideration, the resin application thickness is appropriately from several microns to several hundred microns.

Removal of the unhardened resin is preferably made not by a mechanical force but by a solvent such as alcohol to dissolve the resin in order to maintain the form of the microlens in the hardened portion. However, depending on the type of the solvent, the screen surface component described below of the hardened resin itself may be affected, and if there is no appropriate solvent found, the unhardened portion may be scrapped off with a brush or a spatula.

The component forming the ground of the screen surface is preferably a dark colored material or, more preferably, a black material. For such material, a ceramic, metallic or polymeric material is usable, but from the workability, adhesiveness and weight, a polymeric material such as polyester, polyamide, ABS or poly(vinyl chloride) is suitable. For maintenance of the image contrast, the ground portion preferably has an area of 70% or more or, more preferably, 85% or more of the image display surface.

The scattering microlens should not spread more than required to the ground portion of the screen. The radiation time satisfying this condition is, in the case of an ultraviolet hardening resin, several seconds to several minutes if a metal halide lamp having an unit output of 100 W/cm is used. But, this is often insufficient for the resin to harden and stick to the optical fibers, with the microlens separated when the unhardened resin is removed. To effectively present this, the unhardened part may be removed and the light scattering layer may be radiated again. The same kind of light required for hardening of the microlens may be radiated to the screen surface from the position of the light source 10 or to the incident surface from the position of the light source 9, or both may be employed. Then, the formed microlens has the bond to the optical fibers increased and maintains a sufficient strength. Also, the resin has the degree of hardening increased, then it has the transparency improved and becomes homogeneous as a whole, thus providing a remarkable effect of improvement of the image quality.

To realize the expectable effect of the foregoing method, it is necessary that the photosensitive resin is evenly applied to the screen surface under the condition of FIG. 3. In order to reduce the reflection to minimum and ensure strong adhesion to the optical fibers, the screen surface is generally composed of a black resin or metal. In general, the photosensitive resin has a high surface tension and is not good in wettability, and so if it is directly applied, air bubbles are produced because of the repulsing phenomenon on the surface to generate portions where the resin is not present. According to the method of the invention, a surface active agent is previously applied onto the screen surface or directly added to the photosensitive resin so that the resin is evenly applied over the entire surface of screen.

Various types of surface active agents may be used so long as the characteristics required of the photosensitive resin for the present use, that is, transparency and adhesiveness to optical fibers, are not impaired. Fatty acid salts, ammonium salts and ethers which are generally known as surfactants are usable. Silicone oil, which is known as a compound having an effect of reducing the surface tension may also be used.

The display device thus obtained according to the present invention provides the following distinguished effects on account of the composition described above.

(1) The angle of the field of vision can be established as desired over a wide range.

(2) Image information is not affected by the reflection of the environmental light of disturbance, and so a clear, high resolution image is obtainable.

(3) The light scattering layer is readily formed.

The present invention will now be described with reference to the following examples.

[EXAMPLE 1]

In optical fiber 1, a plastic optical fiber of a diameter of 500 $\mu$m with the core comprised of PMMA (refractive index 1.49) and the clad comprised of a fluorocarbon polymer (refractive index 1.41) was used. The image incident surface was formed in a size of 100 mm $\times$ 76 mm, with the fibers stacked in a hexagonally dense configuration. The image display surface had the fibers arranged in a similar form with the fiber pitch set at 3 mm to give a six-times enlarging function. The size of the image display surface was 600 mm $\times$ 456 mm. For the ground portion of the screen, an ABS resin was used. After cutting the fibers to the face of the ABS resin, an acrylic ultraviolet ray hardening resin having added thereto 10% of 5 $\mu$ $Al_2O_3$ powder as a scattering agent and 1% of a silicone oil for reducing the surface tension was applied in a thickness of about 250 microns, and the ultraviolet ray was radiated from the incident surface for about 2 minutes to produce hardened resin portions serving as scattering microlens on the image display surface. For the light source, a high pressure mercury lamp of 800 W output was used, and the ultraviolet ray intensity on the image display surface was set at 0.15–0.3 mW/cm$^2$. After radiation, unhardened portions of the ultraviolet ray hardened resin were removed by a brush to produce a screen surface. The area of the light scattering layer and that of the ground were 11% and 89% respectively.

The image obtained on the image display surface in the present example was a clear image of high resolution. The angle of the field of vision was, when defined as having the luminance reduced by half, about 45°. According to this method, it is impossible to set a desired angle of the field of vision through adjustment of the coating thickness and the quantity of radiation light.

[EXAMPLE 2]

To fabricate an image display device by a similar method to that in Example 1, the ultraviolet ray was radiated to the screen surface continuously for 8 hours with a metal halide lamp of 250 W output used as a source of light. The resin forming the microlens had the degree of hardening increased, an image was obtained having the uniformity improved, and eliminating the unevenness due to subtle difference in the coating thickness and quantity of radiation light. Also, adhesion to the fibers was improved to a strength enough to withstand the impact in transportation.

Industrial Application

The display device thus obtained is very useful as a large display device of about 50–200 inches being capable of displaying a small image presented on a liquid crystal surface through enlargement into a clear image of high contrast and allowing a number of persons to simultaneously observe in indoors as well as outdoor settings.

We claim:

1. An image display system comprising an optical fiber bundle comprising optical fibers having a first set of end faces disposed on a surface of the image display system and a second set of end faces connected to an image incident surface, wherein the surface of the image display system comprises a plurality of light scattering microlenses distributed spotwise and bonded to the first set of end faces of the optical fiber bundle and wherein the microlenses comprise a transparent resin granular light scattering material.

2. An image display system comprising an optical fiber bundle comprising optical fibers having a first set of end faces-disposed on the surface of the image display system and a second set of end faces connected to an image incident surface, wherein the surface of the image display system comprises a plurality of light scattering microlenses wherein the microlenses are distributed spotwise and bonded to the first set of end faces of the optical fiber bundle, and wherein the microlenses comprise a transparent resin having depressions and projections formed on the surface of the resin.

3. An image display device as set forth in claim 1 or 2 wherein the light scattering microlenses are formed on each of the first set of end faces of each optical fiber contained in the optical fiber bundle.

4. An image display device as set forth in claim 1 or 2 wherein said transparent resin is a photosensitive resin.

5. An image display device as set forth in claim 1 or 2 wherein the light scattering material is a transparent granular material having a grain size greater than 800 nm.

6. An image display device as set forth in claim 1 wherein the light scattering material is in the form of light reflective fine particles.

7. An image display device as set forth in claim 1 or 2 wherein the part of the image display surface not constituting light scattering microlenses is dark colored.

8. An image display device as set forth in claim 1 or 2 wherein the light scattering microlenses constitute 30% or less in area of the image display surface.

9. An image display device as set forth in claim 1 or 2 wherein the light scattering microlenses constitute 15% or less in area of the image display surface.

10. An image display device as set forth in claim 1 or 2 wherein at least one of said light scattering microlenses has a diameter larger than a diameter of the end face of a respective optical fiber.

11. A method of manufacturing an image display device comprising the steps of: disposing spotwise a first set of end faces of an optical fiber bundle on a surface of said image display device; applying a photosensitive resin onto said surface of said image display device; hardening the resin around the first set of end faces of the optical fibers on the image display surface by radiating a beam of light from a second set of end faces of the optical fiber bundle; and removing unhardened portions of said resin.

12. A method of manufacturing an image display device comprising the steps of: disposing spotwise a first set of end faces of an optical fiber bundle on a surface of said image display device; applying a photosensitive resin onto said surface of said image display device; hardening the resin around the first set of end faces of the optical fibers on the image display surface by radiating a beam of light from a second set of end faces of the optical fiber bundle; and removing unhardened portions of said resin; and then imparting depressions and projections to the hardened surface.

13. An image display device manufacturing method as set forth in claim 11 or 12 wherein the photosensitive resin is a photosensitive resin having added thereto a light scattering material in the form of grains.

14. An image display device manufacturing method as set forth in claim 11 or 12 wherein after removal of the unhardened portions, light is again radiated to the formed light scattering layers.

15. An image display device manufacturing method as set forth in claim 11 or 12 wherein in applying the photosensitive resin to the image display surface, a surface active agent is previously applied to the image display surface.

16. An image display device manufacturing method as set forth in claim 11 or 12 wherein in applying the photosensitive resin to the image display surface, a surface active agent is Previously added to the photosensitive resin.

* * * * *

UNITED STATES PATENT AND TRADEMARK OFFICE
CERTIFICATE OF CORRECTION

PATENT NO. : 5,384,882

DATED : January 24, 1995

INVENTOR(S) : Minoru Shimamune, et al.

It is certified that error appears in the above-indentified patent and that said Letters Patent is hereby corrected as shown below:

The sheet of drawing, consisting of figure 5 should be added as shown on the attached sheet.

On the title page, 16 Claims, 2 Drawing Sheets should read--16 Claims, 3 Drawing Sheets--.

Signed and Sealed this

Ninth Day of May, 1995

Attest:

BRUCE LEHMAN

Attesting Officer          Commissioner of Patents and Trademarks